(12) United States Patent
Hakimiyan et al.

(10) Patent No.: US 9,087,658 B2
(45) Date of Patent: Jul. 21, 2015

(54) ACTUATION ASSEMBLY FOR USE WITH A TOUCHSCREEN DEVICE

(75) Inventors: Rustom Ardeshir Hakimiyan, Skokie, IL (US); Anthony Cerra, Chicago, IL (US)

(73) Assignee: SteelSeries ApS, Valby (DK)

( * ) Notice: Subject to any disclaimer, the term of this patent is extended or adjusted under 35 U.S.C. 154(b) by 202 days.

(21) Appl. No.: 13/587,269

(22) Filed: Aug. 16, 2012

(65) Prior Publication Data

US 2013/0118881 A1 May 16, 2013

Related U.S. Application Data

(60) Provisional application No. 61/524,678, filed on Aug. 17, 2011.

(51) Int. Cl.
*G06F 3/033* (2013.01)
*G09G 5/00* (2006.01)
*H01H 13/04* (2006.01)
*G06F 3/039* (2013.01)
*G06F 3/044* (2006.01)

(52) U.S. Cl.
CPC .............. *H01H 13/04* (2013.01); *G06F 3/033* (2013.01); *G06F 3/039* (2013.01); *G06F 3/044* (2013.01)

(58) Field of Classification Search
CPC .............. H01H 13/70; H01H 2201/00; H01H 2203/048; H01H 2203/058; H01H 2205/00; H01H 2205/006; H01H 2215/028; H01H 221/034; H01H 2217/00; H01H 2221/05; H01H 2221/052; H01H 2221/054; H01H 2231/016; H01H 2233/00; H01H 2233/07
USPC .............................. 345/174, 173, 184; 463/37
See application file for complete search history.

(56) References Cited

U.S. PATENT DOCUMENTS

| | | | |
|---|---|---|---|
| 6,492,978 B1 * | 12/2002 | Selig et al. | 345/173 |
| 8,462,133 B2 | 6/2013 | Lynch et al. | |
| 2001/0003326 A1 * | 6/2001 | Okada et al. | 200/516 |
| 2007/0257821 A1 * | 11/2007 | Son et al. | 341/22 |
| 2010/0026635 A1 * | 2/2010 | Dimitrov et al. | 345/173 |

* cited by examiner

*Primary Examiner* — Edwin A. Leon
*Assistant Examiner* — Anthony R. Jimenez
(74) *Attorney, Agent, or Firm* — Guntin & Gust, PLC; Ralph Trementozzi

(57) ABSTRACT

An actuator includes a housing, a resilient member and an actuator member. These components are arranged such that the actuator member is displaceable relative to the housing such that upon application of a force to the actuator member against a bias of the resilient member, a terminal end of the actuator member contacts a target area of a screen surface of a touchscreen device such that an electrical charge is allowed to be conducted between a top portion of the actuator member and the target area of the screen surface.

20 Claims, 6 Drawing Sheets

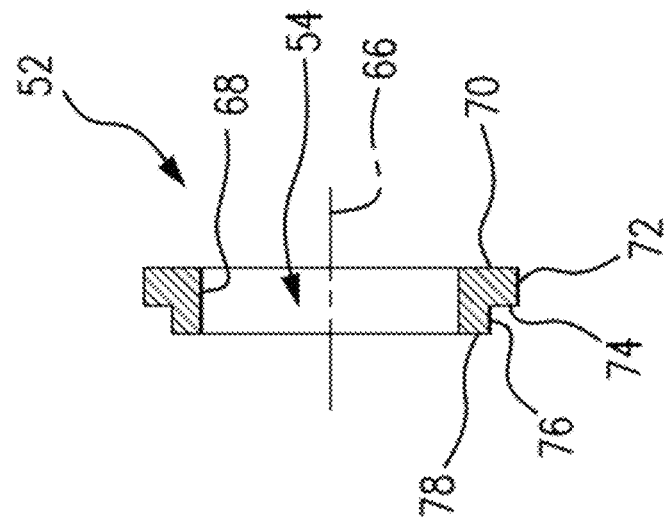
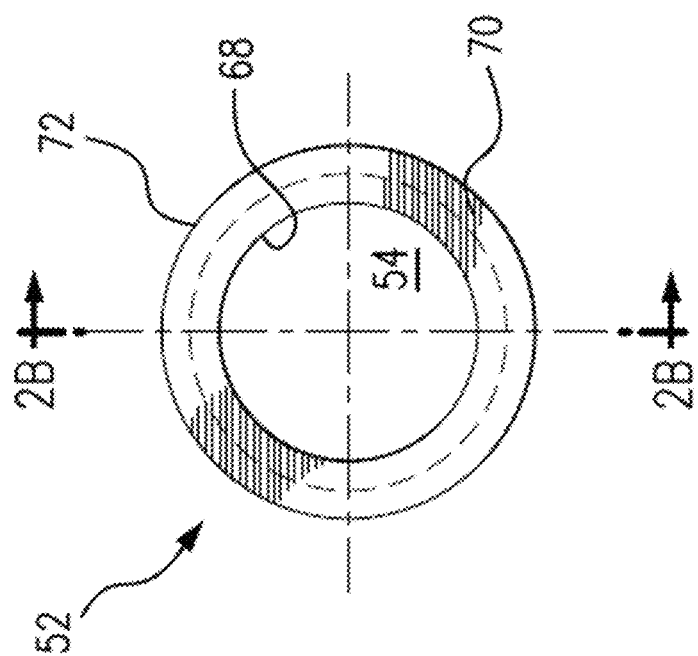

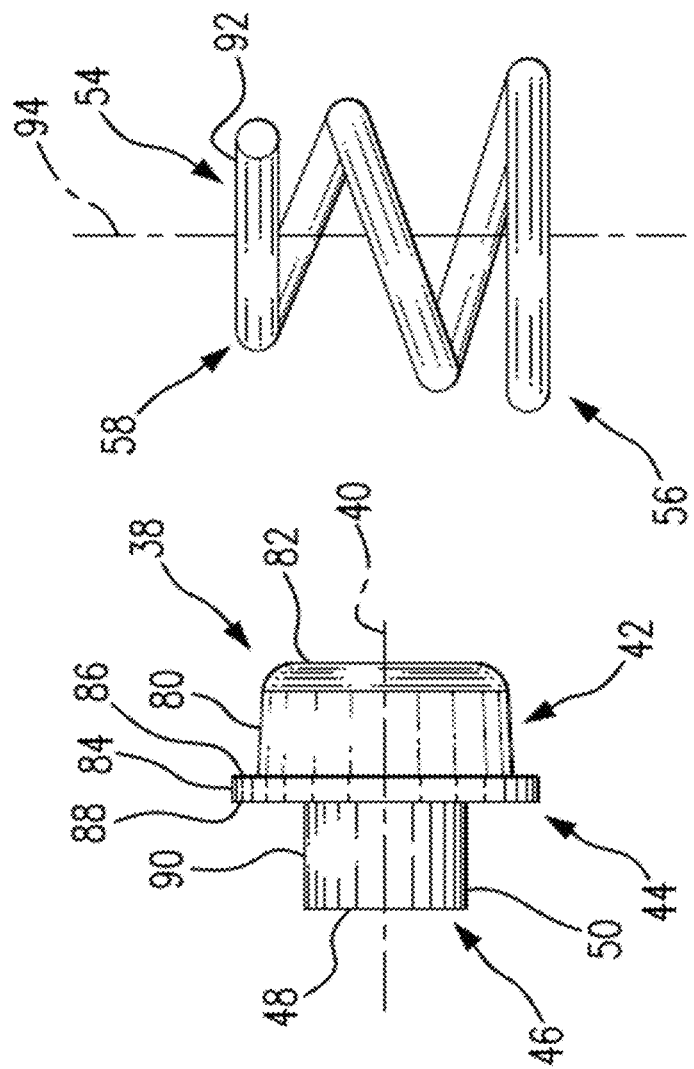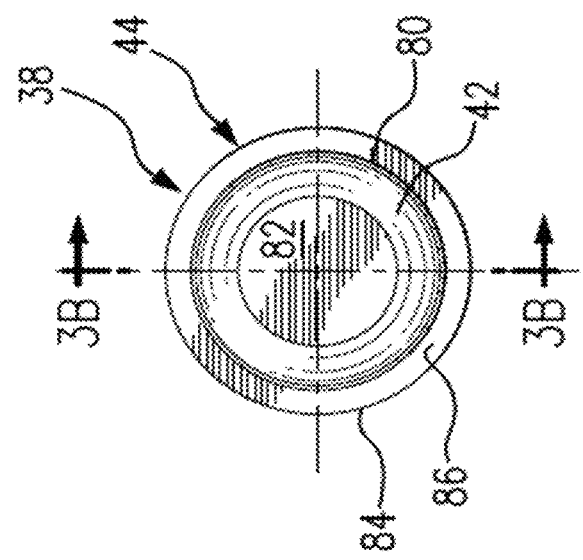

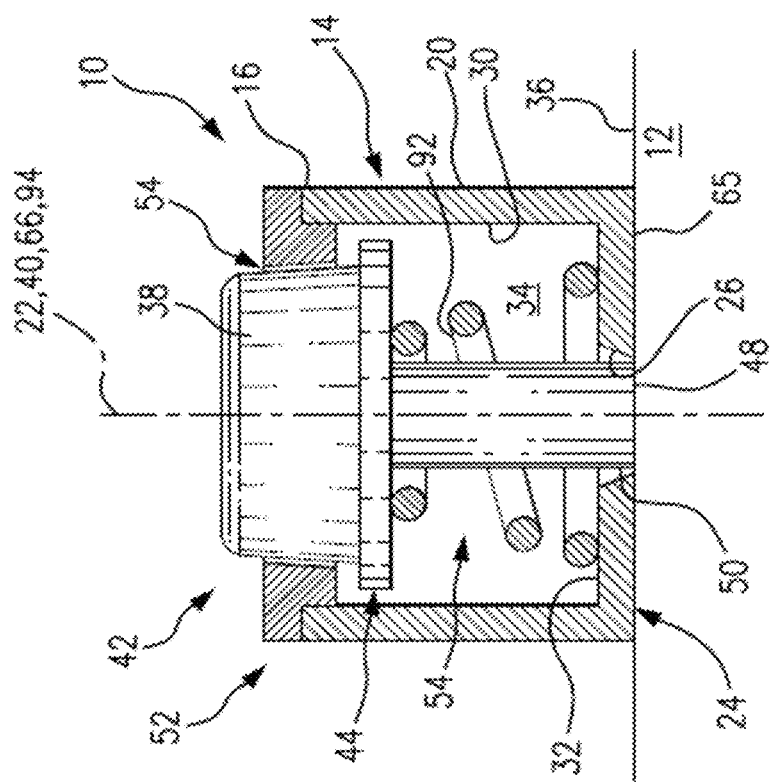
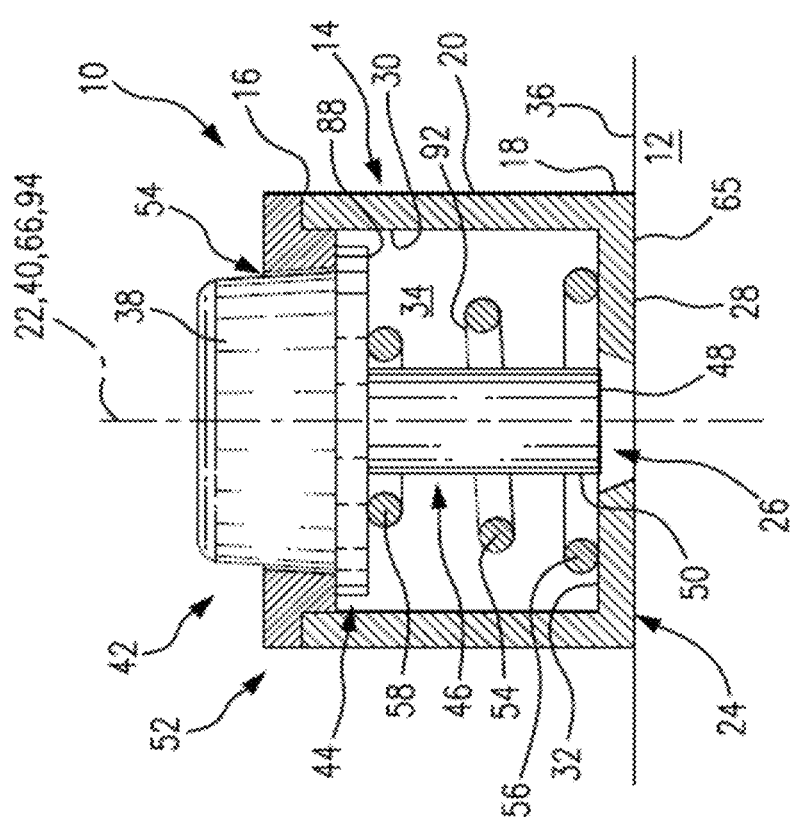

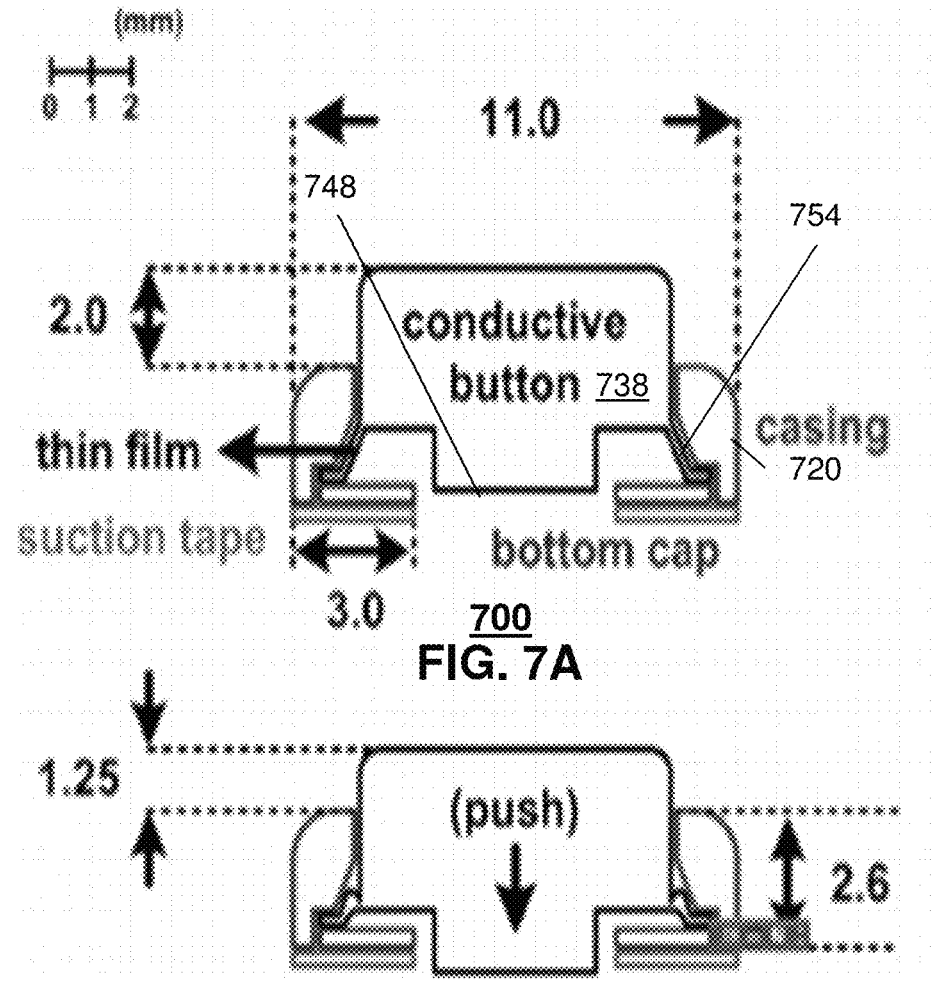
FIG. 7A
FIG. 7B
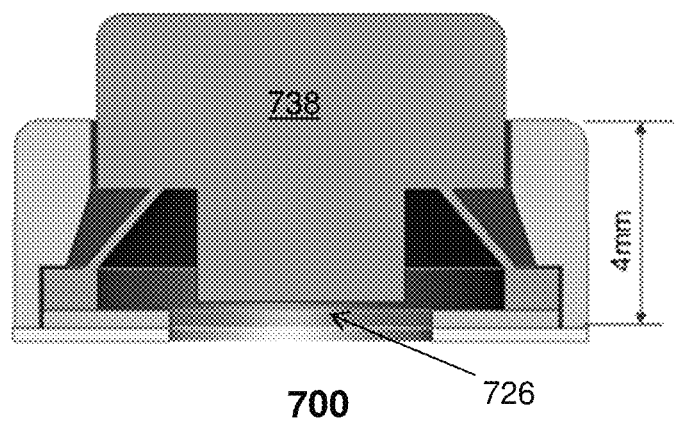
FIG. 7C

ACTUATION ASSEMBLY FOR USE WITH A TOUCHSCREEN DEVICE

CROSS-REFERENCE TO RELATED APPLICATIONS

This application claims priority to U.S. Provisional Patent Application Ser. No. 61/524,678 filed Aug. 17, 2011, which is incorporated herein by reference in its entirety.

FIELD OF THE DISCLOSURE

The present disclosure relates generally to add-on components for touchscreens such as with tablet and smartphone devices. More specifically, the present disclosure relates to a removable actuation assembly having a conductive button for use with touchscreen devices to enhance the experience of various applications, such as gaming applications.

BACKGROUND

Tablet and smartphone devices with touchscreen functionality are becoming increasingly popular, particularly as gaming platforms. Typical games played on such touchscreen gaming devices require a user to touch a particular area of a screen surface to issue a command to the touchscreen gaming device, such as a command to fire a weapon. However, the user does not experience a physical indication that the appropriate area of the screen is being touched to issue a command.

BRIEF DESCRIPTION OF THE DRAWINGS

FIG. 2A is a top view of an embodiment of an end cap of an actuation assembly of the present disclosure;
FIG. 2B is a side section view of the embodiment of the end cap of FIG. 2A;
FIG. 3A is a top view of an embodiment of an actuator member of an actuation assembly of the present disclosure;
FIG. 3B is a side section view of the embodiment of the actuator member of FIG. 3A;
FIG. 4 is a side view of an embodiment of a resilient member of an actuation assembly of the present disclosure;
FIG. 5A is a side sectional view of an embodiment of an actuation assembly of the present disclosure in a first actuator position;
FIG. 5B is a side sectional view of the embodiment of the actuation assembly of FIG. 5A in a second actuator position;
FIG. 7A, C are sectional side views of an embodiment of an actuation assembly of the present disclosure in a first actuation position;
and
FIG. 7B is a sectional side view of the embodiment of the actuation assembly of FIG. 7A, C in a second actuation position.

DETAILED DESCRIPTION

Figure 1B:
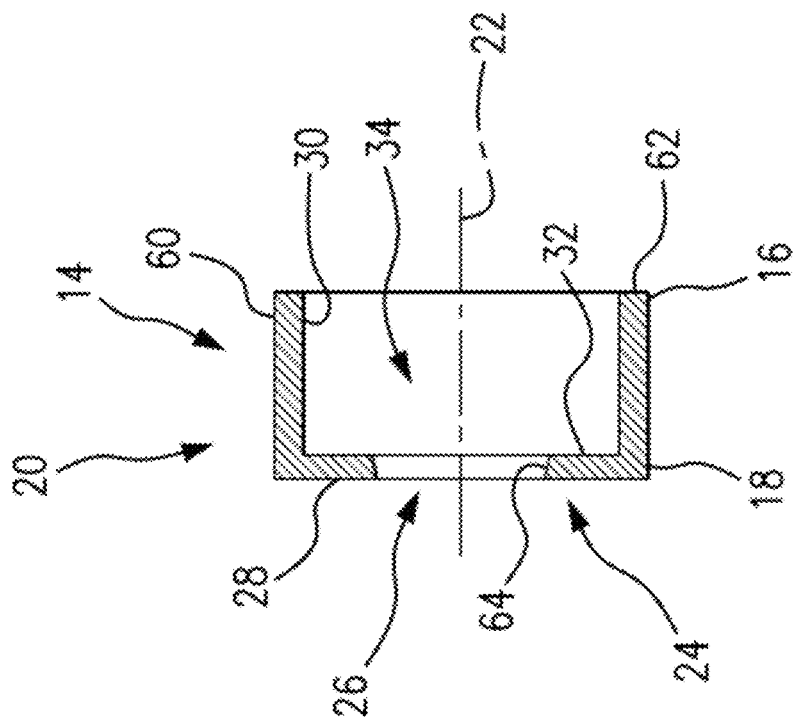
FIG. 1B is a side section view of the embodiment of the housing of FIG. 1A.
Figure 1A:
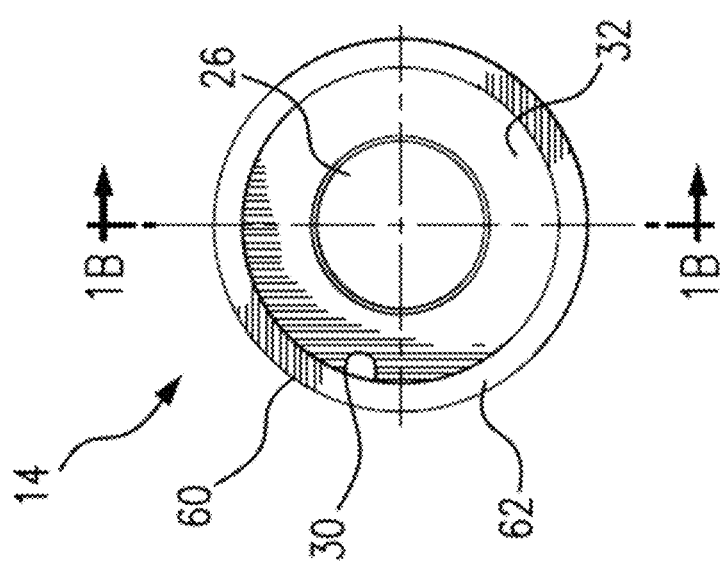
FIG. 1A is a top view of an embodiment of a housing of an actuation assembly of the present disclosure.

In one exemplary embodiment, an actuation assembly is provided for use with a touchscreen device. The actuation assembly includes a housing having a wall portion and a bottom portion that define a housing interior, where the bottom portion has a bottom aperture and a housing contact surface, where the housing contact surface includes a connecting member that provides a releasable connection between the housing contact surface and a screen surface of the touchscreen device. The actuation assembly includes an actuator member positioned at least partially in the housing interior, where the actuator member includes a top portion and a stem portion, where the stem portion includes a terminal end substantially aligned with the bottom aperture of the bottom portion of the housing, where the actuator member includes electrically conductive material providing an electrically conductive path between the top portion and the terminal end. The actuation assembly includes an end cap connected to the housing, where the end cap has a cap aperture, where the top portion of the actuator member is positioned at least partially through the cap aperture. The actuation assembly includes a resilient member positioned in the housing interior between the top portion of the actuator member and the bottom portion of the housing. The resilient member biases the actuator member in a first actuation position in which the terminal end of the stem portion of the actuator member is remote from the housing contact surface of the bottom portion of the housing such that the top portion of the actuator member is electrically isolated from a target area of the screen surface of the touchscreen device. The actuator member is displaceable relative to the housing such that a force applied to the top portion of the actuator member against a bias of the resilient member displaces the actuator member to a second actuation position in which the terminal end of the stem portion is received into the bottom aperture of the housing and the terminal end of the stem portion is coplanar with or substantially coplanar with the housing contact surface of the bottom portion of the housing. In the second actuation position, the terminal end of the stem portion of the actuator member contacts the target area of the screen surface of the touchscreen device to provide an electrically conductive path between the screen surface and the top portion of the actuator member.

In one exemplary embodiment, an actuation assembly is provided for use with a touchscreen device. The actuation assembly includes a housing having a bottom aperture and a cap aperture, where the housing defines a housing interior, where the housing includes a connecting member for releasably connecting the housing to a screen surface of the touchscreen device. The actuation assembly includes a resilient member. The actuation assembly includes an actuator member positioned at least partially in the housing interior, where the actuator member has a top portion and a terminal end that is opposite to the top portion, where the resilient member biases the actuator member to a first actuation position in which the top portion extends at least partially through the cap aperture, where the actuator member comprises material that allows an electrical charge to be conducted between the top portion and the terminal end. The actuator member is displaceable relative to the housing such that upon application of a force to the actuator member against a bias of the resilient member, the terminal end moves at least partially through the bottom aperture of the housing to allow the terminal end to contact a target area of the screen surface of the touchscreen device such that the electrical charge is allowed to be conducted between the top portion of the actuator member and the target area of the screen surface.

In one exemplary embodiment, an actuation assembly is provided for use with a touchscreen device. The actuation assembly includes a deformable housing member having a base portion, a button portion, and an intermediate portion between the base portion and the button portion, where the intermediate portion inwardly extends from the base portion and outwardly extends from the button portion. The actuation assembly includes a support member connected to the base portion of the housing member, where a bottom contact surface of the support member releasably connects to a screen surface of the touchscreen device, where the support member comprises an electrically-insulating material. A force applied to the button portion causes the housing member to deform from a first actuation position into a second actuation position. In the first actuation position, the intermediate portion is longitudinally offset from a reference plane that is coplanar with the bottom contact surface of the support member such that the intermediate portion is separated from the screen surface of the touchscreen device. In the second actuation position, a portion of the intermediate portion intersects the reference plane such that the portion of the intermediate portion is in contact with a target area of the screen surface of the touchscreen device. The button portion and the intermediate portion comprise an electrically-conductive material such that in the first actuation position, an electrical charge is prevented from being conducted between the button portion to the target area, and such that in the second actuation position, the electrical charge is conducted between the button portion and the target area.

As illustrated in FIGS. 5A and 5B, an actuation assembly 10 for use with a touchscreen gaming device 12 (such as, for example, a tablet or smartphone device with touchscreen functionality, or any other type of capacitive touchscreen device, including those primarily intended for gaming) includes a housing 14 having a first end 16 and a second end 18, wherein a wall portion 20 extends along a longitudinal axis 22 from the first end 16 to the second end 18, and wherein a bottom portion 24 is disposed at or adjacent to the second end 18 such that the bottom portion 24 is normal to the longitudinal axis 22, the bottom portion 24 having a bottom aperture 26 and a planar housing contact surface 28, wherein an inner wall 30 of the wall portion 20 and an inner bottom surface 32 of the bottom portion 24 at least partially define a housing interior 34, and wherein the housing contact surface 28 is adapted to releasably secure the housing contact surface 28 with a screen surface 36 of the touchscreen gaming device 12. The actuation assembly 10 also includes an elongated actuator member 38 that extends along a longitudinal axis 40, the actuator member 38 being disposed at least partially in the housing interior 34, the actuator member 38 including a top portion 42, a flange portion 44, and a stem portion 46, wherein a planar stem contact surface 48 is disposed at a terminal end 50 of the stem portion 46, the stem contact surface 48 being normal to the longitudinal axis 40 of the actuator member 38. The actuation assembly 10 further includes an end cap 52 coupled to the first end 16 of the housing 14, the end cap 52 having a central aperture 54, and the top portion 42 of the actuator member 38 being disposed through the central aperture 54. The actuation assembly 10 also includes a resilient member 54 disposed within the housing interior 34, the resilient member 54 having a first end 56 and a second end 58, wherein the first end 56 is in engagement with the bottom portion 24 of the housing 14 and the second end 58 is in engagement with the flange portion 44 of the actuator member 38.

As shown in FIG. 5A, the resilient member 54 biases the actuator member 38 in a first actuation position in which the stem contact surface 48 of the stem portion 46 of the actuator member 38 is longitudinally offset from the housing contact surface 28 of the bottom portion 24 of the housing 10. Referring to FIG. 5B, the actuator member 38 is longitudinally displaceable relative to the housing 10 such that the a longitudinal force applied to the top portion 42 of the actuator member 38 towards the second end 18 of the housing 10 displaces the actuator member 38 to a second actuation position in which the terminal end 50 of the stem portion 46 is received into the bottom aperture 26 of the housing 10 and the stem contact surface 48 of the stem portion 46 of the actuator member 38 is coplanar with the housing contact surface 28 of the bottom portion 26 of the housing 10. In this second actuation position, the stem contact surface 48 of the actuator member 38 contacts a desired portion of the screen surface 36 of the touchscreen gaming device 12 such that an electrical charge may be conducted between a user's finger and the desired portion of the screen surface 36 of the touchscreen gaming device 12. So configured, the actuation assembly 10 provides an arcade-style button with a tactile feel that provides a physical indication that a command is issued to the touchscreen gaming device 12.

As illustrated in FIGS. 1A, 1B, 5A, and 5B and as discussed above, the housing 14 of the actuation assembly 10 includes the wall portion 20 that extends along the longitudinal axis 22, the wall portion 20 having the first end 16 and the second end 18. The wall portion 20 of the housing 14 may have any suitable cross-sectional shape. For example, the wall portion 20 may be cylindrical, and the cylindrical wall portion 20 may include a cylindrical outer wall 60 and the cylindrical inner wall 30 with each of the outer wall 60 and inner wall 30 coaxially aligned with the longitudinal axis 22. Each of each of the outer wall 60 and inner wall 30 may have an outer wall diameter and an inner wall diameter, respectively. The outer wall diameter and the inner wall diameter may have any suitable value, such as 11 mm and 9.4 mm, respectively. A planar top wall surface 62 may extend from the outer wall 60 to the inner wall 30 such that the top wall surface 62 may be normal to the longitudinal axis 22.

Still referring to FIGS. 1A, 1B, 5A, and 5B, the bottom portion 24 of the housing 14 may inwardly extend from the wall portion 20 at or adjacent to the second end 18 of the housing 14. The bottom portion 24 may include the inner bottom surface 32 that may be planar or substantially planar and the housing contact surface 28 that may planar and longitudinally offset from the inner bottom surface 32. The housing contact surface 28 may be separated from the top wall surface 62 of the wall portion 20 by any suitable distance, such as 6.2 mm, for example. The bottom aperture 26 of the bottom portion 24 may longitudinally extend between the inner bottom surface 32 and the housing contact surface 28. The bottom aperture 26 may have a circular or substantially circular cross-sectional shape, and the circular bottom aperture may be coaxially aligned with the longitudinal axis 22. The bottom aperture 26 may also include a frustoconical sidewall 64 that may converge from the inner bottom surface 32 towards the housing contact surface 28. Alternatively, the sidewall 64 may be cylindrical instead of frustoconical. The diameter of the bottom aperture 26 at the housing contact surface 28 may have any suitable value, such as a diameter between 2.0 mm and 12.0 mm. Preferably, the diameter of the bottom aperture 26 may be between 3.0 mm and 7.5 mm. For example, the diameter of the bottom aperture 26 may be approximately 5.0 mm. The housing 14 may be formed from any suitable material. For example, the housing 14 may be formed of acrylonitrile butadiene styrene ("ABS"). The housing 14 may be formed as a single and unitary part, or the housing 14 may be formed as an assembly of two or more component parts.

As illustrated in FIGS. 5A, and 5B, the housing contact surface 28 of the housing 14 may be covered by a thin layer of adhesive material 65. This adhesive material 65 may be a surface coating or may be a layer of tape. More specifically, the tape may include a plurality of micro-suction cups disposed on a surface of the tape that faces away from the housing 14. These micro suction cups engage the screen surface 36 of the touchscreen gaming device 12 to releasably secure the actuation assembly 10 to the touchscreen gaming device 12 at a desired location. For example, the tape having the plurality of micro-suction cups may be "REGABOND-S" manufactured by the Exel Trading Co., Ltd. The tape thickness maybe 0.3 mm, 0.5 mm, 0.8 mm, or 0.15 mm. However, the tape may have any thickness suitable for a particular application. The tape may cover any portion of the housing contact surface 28, or the entire housing contact surface 28. Instead of the tape having the plurality of micro-suction cups, any suitable adhesive material 65 may be used to releasably secure the actuation assembly 10 to the touchscreen gaming device 12.

As illustrated in FIGS. 2A, 2B, 5A, and 5B, the actuation assembly 10 also includes the end cap 52 that is adapted to be coupled to the first end 16 of the housing. The end cap 52 may have the shape of an annular ring that is symmetrical about a longitudinal axis 66. The end cap 52 may have a cylindrical inner surface 68 that defines the central aperture 54, and the diameter of the inner surface 68 may have any suitable value and will be discussed in more detail below. A planar top surface 70 may outwardly extend from the inner surface 68 such that the top surface 70 is normal to the longitudinal axis 66. An outer flange surface 72 may longitudinally extend from the top surface 70, and the outer flange surface 72 may be cylindrical and may be coaxially-aligned with the longitudinal axis 66. The diameter of the outer flange surface 72 may be equal or substantially equal to the diameter of the outer wall 60 of the housing 14. A planar bottom flange surface 74 may inwardly extend from an end of the outer flange surface 72 such that the bottom flange surface 74 is normal to the longitudinal axis 66. The top surface 70 and the bottom flange surface 74 may be separated by any suitable distance, such as 1.1 mm. An intermediate surface 76 may longitudinally extend from the bottom flange surface 74, and the intermediate surface 76 may be cylindrical and may be coaxially-aligned with the longitudinal axis 66. The diameter of the intermediate surface 76 may be slightly smaller than the diameter of the inner wall 30 of the housing 14. For example, the diameter of the intermediate surface 76 may be 9.4 mm. A planar bottom surface 78 may inwardly extend from an end of the intermediate surface 76 such that the bottom surface 78 is normal to the longitudinal axis 66. The top surface 70 and the bottom surface 78 may be separated by any suitable distance, such as 2.1 mm. The end cap 52 may be made from any suitable material, such as ABS.

As illustrated in FIGS. 3A, 3B, 5A and 5B, the actuation assembly 10 also includes an actuator member 38, and the actuator member 38 may include a top portion 42, a flange portion 44, and a stem portion 46. The top portion 42 may include a sidewall 80 that may correspond in cross-sectional shape to the inner surface 68 of the end cap 52. Specifically, if the inner surface 68 of the end cap 52 is cylindrical, then sidewall 80 may also be cylindrical, and the cylindrical sidewall 80 may extend along the longitudinal axis 40 such that the cylindrical sidewall 80 is coaxial with the longitudinal axis 40. The cylindrical sidewall 80 of the top portion may have a diameter that is slightly smaller than the diameter of the cylindrical inner surface 68 of the end cap 52 such that the top portion 42 of the actuator member 38 may be received into the central aperture 54 of the end cap 52. The top portion 42 may also include a top contact surface 82 that is normal or substantially normal to the longitudinal axis 40. The top contact surface 82 may intersect the sidewall 80 to form a right angle or the intersection of the top contact surface 82 and the sidewall 80 may be rounded. Alternatively, the top contact surface 82 may be planar and/or at least partially contoured, and a circumferential ridge may upwardly extend around the perimeter of the top contact surface 82.

Still referring to FIGS. 3A, 3B, 5A and 5B, the actuator member 38 may also include the flange portion 44 disposed between the top portion 42 and the stem portion 46. The flange portion 44 includes a cylindrical flange sidewall 84, and the flange sidewall 84 may be coaxially aligned with the longitudinal axis 40. The flange sidewall 84 may have a diameter that is slightly smaller than the diameter of the cylindrical inner wall 30 of the housing 14 but larger than the inner surface 68 of the end cap 52. For example, the flange sidewall 84 may have a diameter of 9.0 mm. A flange top surface 86 may extend from a first end of the flange sidewall 84 to the sidewall 80 of the top portion 42, and the flange top surface 86 may be normal to the longitudinal axis 40. A flange bottom surface 88 may inwardly extend from a second end of the flange sidewall 84, and the flange bottom surface 88 may be parallel to and offset from the flange top surface 86. The flange bottom surface 88 may be offset from the flange top surface 86 by any suitable distance, such as 0.8 mm.

The actuator member 38 may also include the stem portion 46 that extends from the flange portion 44, and the stem portion 46 may include a stem sidewall 90. The stem sidewall 90 may have any suitable shape. Specifically, the stem sidewall 90 may be cylindrical and may be coaxially aligned with the longitudinal axis 40. The diameter of the stem sidewall 90 may be slightly smaller than the diameter of the bottom aperture 26 at the housing contact surface 28 such that when the actuator member 38 is longitudinally displaced relative to the housing 14, the stem portion 46 of the actuator member 38 may be received into the bottom aperture 26 of the housing 14. For example, the diameter of the stem sidewall 90 may be 4.7 mm. The stem contact surface 48 may be disposed at the terminal end 50 of the stem portion 46, and the stem contact surface 48 may be planar and may be normal to the longitudinal axis 40. The stem contact surface 48 may be offset from the flange top surface by any suitable distance, such as 4.6 mm.

The actuator member 38 may be formed from any suitable material. For example, the actuator member 38 may be formed from a blend of polyurethane and carbon dust (10% to 60%, and preferably 15% to 25%, by weight) and this blend of polyurethane and carbon dust allows the actuator member 38 to conduct electricity. However, the actuator member 38 may be formed from any suitable material or materials that allow electricity to be conducted from the top contact surface 82 to the stem contact surface 48 of the actuator member 38 (or vice versa). The actuator member 38 may be formed as a single and unitary part, or the actuator member 38 may be formed as an assembly of two or more component parts.

As illustrated in FIGS. 4, 5A, and 5B, the actuation assembly 10 also includes a resilient member 54. The resilient member 54 may be a diaphragm spring or a coil spring, and the coil spring may have any suitable shape, such as a cylindrical shape or a frustoconical shape. Specifically, the frustoconical coil spring 92 may be symmetrically formed about a longitudinal axis 94, and the frustoconical coil spring 92 may have a minimum diameter at the second end 58 that is larger than the diameter of the stem sidewall 90 but smaller than the diameter of the flange sidewall 84. For example, the minimum diameter of the frustoconical coil spring 92 may be 6.0 mm. In addition, the frustoconical coil spring 92 may have a maximum diameter at the first end 56 that is larger than the maximum diameter of the bottom aperture 26 of the housing 14 but smaller than the diameter of the inner wall 30 of the housing 14. For example, the maximum diameter of the frustoconical coil spring 92 may be 9.0 mm. The frustoconical coil spring 92 may be made from any suitable material, such as stainless steel wire having a diameter of 0.5 mm.

When the actuation assembly 10 is assembled, as illustrated in FIGS. 5A and 5B, the resilient element 54, such as the frustoconical coil spring 92, may be disposed in the housing interior 34. Specifically, the first end 56 of the frustoconical coil spring 92 may in contact with the inner bottom surface 32 of the bottom portion 24 of the housing 14, and the longitudinal axis 94 of the frustoconical coil spring 92 may be coaxially aligned with the longitudinal axis 22 of the housing 14. The longitudinal axis 40 of the actuator member 38 may also be coaxially aligned with the longitudinal axis 94 of the frustoconical coil spring 92, and the second end 58 of the frustoconical coil spring 92 may be in contact with the flange bottom surface 88.

As illustrated in FIGS. 5A and 5B, the end cap 52 may be coupled to the open first end 16 of the housing 14 such that the longitudinal axis 66 of the end cap 52 is coaxially aligned with the longitudinal axis 22 of the housing 14. The end cap 52 may be coupled to the first end 16 of the housing 14 by any method known in the art, such as by ultrasonic welding or by an adhesive bond. In a first actuator position, shown in FIG. 5A, the bottom flange surface 74 of the end cap 52 may be in contact with or immediately adjacent to the top wall surface 62 of the wall portion 20 of the housing 14. In addition, the bottom surface 78 of the end cap 52 may be in contact or adjacent to the flange top surface 86 of the actuator member 38. With the end cap 52 secured to the housing 14 as described, the longitudinal distance between the flange bottom surface 88 of the actuator member 38 and the inner bottom surface 32 of the housing 14 is less than the unsprung length (i.e., the longitudinal distance between the first end 56 and the second end 58) of the frustoconical coil spring 92 such that the frustoconical coil spring 92 biases the actuator member 38 in the first actuator position. In the first actuator position, the stem contact surface 48 of the stem portion 46 of the actuator member 38 is disposed within the bottom aperture 26 of the housing 12 or within the housing interior 34. More specifically, in the first actuator position, the stem contact surface 48 of the stem portion 46 of the actuator member 38 is longitudinally offset from the housing contact surface 28 of the bottom portion 24 of the housing 14. In this first actuation position, the actuation assembly 10 may be secured to a desired portion of the screen surface 36 of a touchscreen gaming device 12 by aligning the housing contact surface 28 of the bottom portion 24 of the housing 14 with the screen surface 36 and placing the housing contact surface 28 onto the screen surface 36. Due to the thin layer of adhesive material 65 (such as a layer of tape having a plurality of micro-suction cups discussed above) covering the housing contact surface 28, a downward force on the actuation assembly 10 releasably secures the housing contact surface 28 of the actuation assembly 10 to the screen surface 36.

When it is desired to engage the actuation assembly (to, for example, fire a weapon while playing a desired game on the touchscreen gaming device 12), a downward longitudinal force is applied to the top contact surface 82 of the top portion 42 of the actuator member 38. If the downward (i.e., a direction towards the second end 18 of the housing 14) force is sufficiently strong to overcome the upward biasing force of the frustoconical coil spring 92 acting on the flange portion 44 of the actuator member 38, the actuator member 38 will downwardly displace such that the stem contact surface 48 is received into the bottom aperture 26 of the bottom portion 24 of the housing 14. Under the influence of the downward longitudinal force, the stem contact surface 48 of the actuator member 38 is eventually displaced (relative to the stationary housing 14 and the stationary end cap 52) to a second actuation position in which the stem contact surface 48 of the actuator member 38 comes into contact with or is immediately adjacent to the screen surface 36. More specifically, in this second actuation position, the terminal end 50 of the stem portion 46 of the actuator member 38 is received into the bottom aperture 26 of the bottom portion 24 of the housing 14 such that the stem contact surface 48 of the actuator member 38 is coplanar with a bottom surface of the adhesive material 65. Because the thickness of the adhesive material may be negligible in relation to the dimensions of the housing, the stem contact surface 48 of the actuator member 38 may be coplanar with or substantially coplanar with the housing contact surface 28 of the bottom portion 24 of the housing 14. As such, an electrical charge generated by the user's finger may be conducted through the actuator member 38 and transmitted to the portion of the screen surface 36 that is in contact with (or is immediately adjacent to) the stem contact surface 48 of the actuator member 38.

By displacing the actuator member from the first actuator position to the second actuator position as described, the user can establish contact with the screen surface 36 of a touchscreen gaming device 12 at a desired time to repetitively, rapidly, and accurately issue a command to the touchscreen gaming device 12, such as a command to fire a weapon during the play of a game on the touchscreen gaming device 12. Moreover, due to the resilient member 54 acting on the actuator member 38, the user experiences a tactile feel when actuating the actuation assembly 10, much like the fell of actuating a button on an arcade game. This tactile feel provides a physical indication that the command to the touchscreen gaming device 12 is being issued, thereby eliminating misfires (for example) due to inaccurate actuations. In addition, the actuation assembly 10 is re-usable, and can easily be removed from and secured to the touchscreen gaming device 12.

Figure 6A:
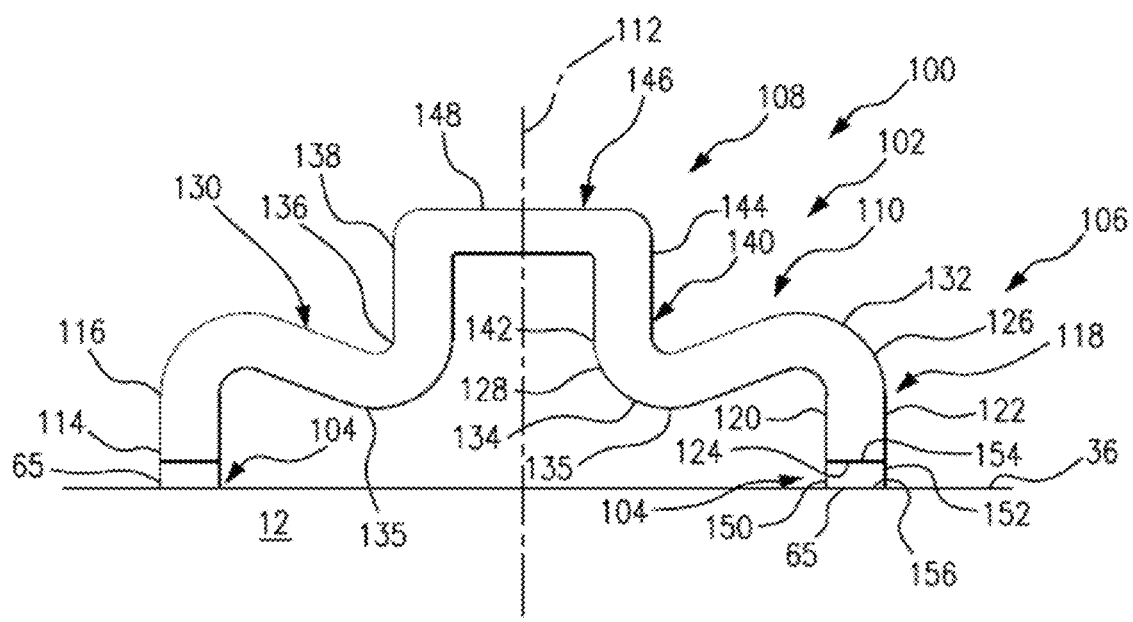
FIG. 6A is a sectional side view of an embodiment of an actuation assembly of the present disclosure in a first actuation position.
Figure 6B:
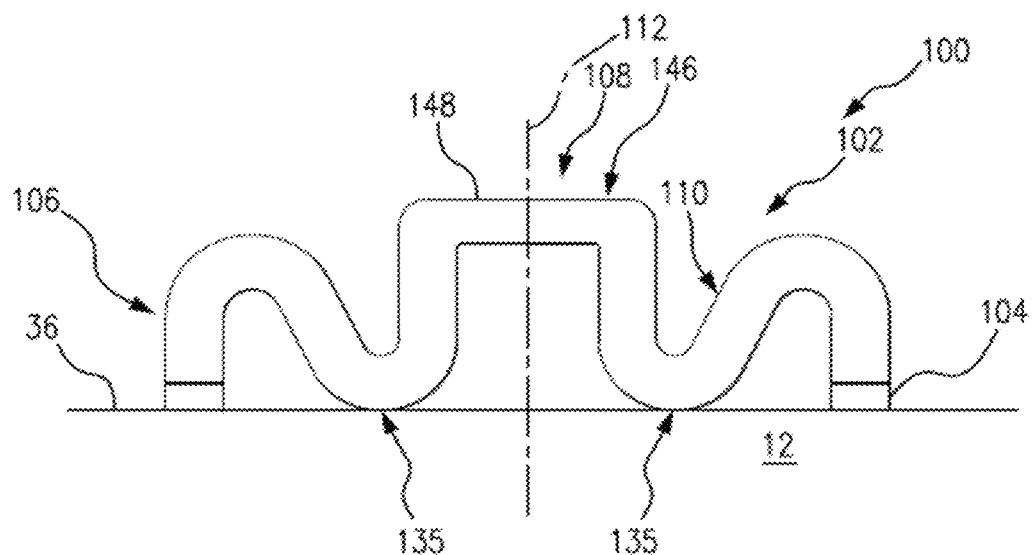
FIG. 6B is a sectional side view of the embodiment of the actuation assembly of FIG. 6A in a second actuation position.

A further embodiment of an actuation assembly 100 is illustrated in FIGS. 6A and 6B. The actuation assembly 100 may include a housing member 102 and a support member 104, and the housing member 102 may include a base portion 106, a button portion 108, and an intermediate portion 110 disposed between the base portion 106 and the button portion 108. The base portion 106 of the housing member 102 may extend along a longitudinal axis 112 such that the base portion 106 has a first end 114 and a second end 116 opposite the first end 114. The base portion 106 may form a cylindrical sidewall 118 having an interior surface 120 and an exterior surface 122 that are each concentric with the longitudinal axis 112. The diameter of the exterior surface 122 may have any suitable value, such as 10 mm. A planar bottom wall 124 may extend from the interior surface 120 to the exterior surface 122, and the bottom wall 124 may be normal to the longitudinal axis 112. Instead of a cylindrical sidewall 118, the sidewall 118 may have any suitable shape or combination of shapes. For example, the sidewall 118 may have the cross-sectional shape of an oval when viewed along the longitudinal axis 112.

As illustrated in FIG. 6A, the housing member 102 of the actuation assembly 100 may also include the intermediate portion 110. The intermediate portion 110 of the housing member 102 may have a generally annular shape and may have a first end 126 and a second end 128 opposite the first end 126. The first end 126 of the intermediate portion 110 may be adjacent to the second end 116 of the base portion 106 such that the intermediate portion 110 inwardly extends (i.e., extends towards the longitudinal axis 112 in a direction substantially normal to the longitudinal axis 112) from the second end 116 of the base portion 106. The intermediate portion 110 may be a contoured wall 130 having a first rounded portion 132 at the first end 126 of the intermediate portion 110 and a second rounded portion 134 at the second end 128 of the intermediate portion 110. An exterior surface of the first rounded portion 132 may be convex, and an exterior surface of the second rounded portion 134 may be concave. The second rounded portion 134 may include a screen contact surface 135 that will be described in more detail below. In further embodiments, the intermediate portion 110 may be a planar wall that is normal or substantially normal to the longitudinal axis 112.

Still referring to FIG. 6A, the housing member 102 of the actuation assembly 100 may also include the button portion 108. The button portion 108 may upwardly extend (i.e., extend along the longitudinal axis 112 in a direction away from the first end 114 of the base portion 106) from the second end 128 of the intermediate portion 110 such that the button portion 108 has a first end 136 (adjacent to the second end 128 of the intermediate portion 110) and a second end 138 opposite the first end 136. The button portion 108 may include a cylindrical sidewall 140 having an interior surface 142 and an exterior surface 144 that are each co-axially aligned with the longitudinal axis 112. A planar or substantially planar top wall 146 may inwardly extend normal to the longitudinal axis 112 from the portion of the sidewall 140 adjacent to the second end 138 of the button portion 108. The top wall 146 may include a top contact surface 148, and the top contact surface 148 may be planar. However, the top contact surface 148 may be contoured (or partially contoured), may have raised surface features (e.g., nubs or ridges), or may have a surface texturing or other surface treatment to increase frictional engagement with a user's finger. The top contact surface 148 may be longitudinally separated from the bottom wall 124 of the base portion 106 by any suitable distance, such as 4 mm. Instead of a planar top wall 146, the top wall 146 may be rounded, partially rounded, or otherwise contoured, and the top contact surface 148 may be correspondingly rounded, partially rounded, or otherwise contoured. In addition, instead of a cylindrical sidewall 140, the sidewall 140 may have any suitable shape or combination of shapes. For example, the sidewall 140 may have the cross-sectional shape of an oval when viewed along the longitudinal axis 112.

The housing member 102 may be formed as a unitary part from a single piece of material. However, the housing member 102 may be comprised of two or more subcomponent parts that are coupled by any means known in the art. The housing member 102 may be made of a deformable and conductive material, such as a thermoplastic elastomer, and preferably santoprene. However, the housing member 102 may be formed from any suitable material or materials that allow electricity to be conducted from the top contact surface 148 to the screen contact surface 135 in a manner that will be described in more detail below.

Referring once more to FIG. 6A, the actuation assembly 100 may include the support member 104, and the support member may be secured to the first end 114 of the base portion 106 of the housing 102. The support member 104 may correspond in cross-sectional shape to the cross-sectional shape of the first end 114 of the base portion 106. Specifically, the support member 104 may have an annular shape, with a cylindrical inner surface 150 and a cylindrical outer surface 152, and each of the inner surface 150 and the outer surface 152 may be coaxially aligned with the longitudinal axis 112. The inner surface 150 may have the same diameter as the interior surface 120 of the sidewall 118 of the base portion 106 and the outer surface 152 may have the same diameter as the exterior surface 122 of the sidewall 118 of the base portion 106. A planar top surface 154 may extend between a top portion of the inner surface 150 and the outer surface 152, and a planar bottom contact surface 156 may extend between a bottom portion of the inner surface 150 and the outer surface 152. The top surface 154 may be separated from the bottom contact surface 156 by any suitable distance, such as 0.5 mm.

The support member 104 may formed of any suitable material that electrically insulates the housing member 102 from the screen surface 36 of the touchscreen gaming device 12. That is, the support member 104 may formed of any suitable material that prevents an electrical charge generated by a user's finger (i.e., by the contact of a user's finger with the top contact surface 148 of the button portion 108) from being conducted through the housing member 102 and the support member 104 to the screen surface 36 of the touchscreen gaming device 12. For example, the support member may be formed from a plastic material, such as ABS. The support member 104 may be secured to the first end 114 of the base portion 106 of the housing member 102 in any manner known in the art, such as, for example, by an adhesive, by interlocking features, by insert molding, or by ultrasonic welding.

Referring again to FIG. 6A, the bottom contact surface 150 of the support member 104 may be covered by a thin layer of adhesive material 65. This adhesive material 65 may be a surface coating or may be a layer of tape, and the adhesive material 65 may be identical to the adhesive material 65 previously discussed. More specifically, the tape may include a plurality of micro-suction cups disposed on a surface of the tape that faces away from the support member 104. These micro suction cups may engage the screen surface 36 of the touchscreen gaming device 12 to releasably secure the actuation assembly 100 to the touchscreen gaming device 12 at a desired location. The tape may cover any portion of the bottom contact surface 150, or the entire bottom contact surface 156. Instead of the tape having the plurality of micro-suction cups, any suitable adhesive material 65 may be used to releasably secure the actuation assembly 100 to the touchscreen gaming device 12.

In use, the actuation assembly 100 is placed at a desired location on the screen surface 36 of the touchscreen gaming device 12. So positioned, the actuation assembly 100 is initially in an un-deformed first actuation position, as illustrated in FIG. 6A. In this first actuation position, the screen contact surface 135 is longitudinally offset from a reference plane that is coplanar with the bottom contact surface 156 of the support member 104. To engage the actuation assembly 100 to, for example, fire a weapon while playing a desired game on the touchscreen gaming device 12, a downward longitudinal force (i.e., a force directed along the longitudinal axis 112 towards the support member 104) is applied by a user's finger to the top contact surface 148 of the button portion 108 of the housing member 102. If the force is sufficiently strong to deform the material comprising the housing member 102, a portion of the housing member 102 is moved from the first actuation position to the second actuation position. In the process of deforming from the first actuation position to the second actuation position, the button portion 108 and the second end 128 of the intermediate portion 110 of the housing member 102 downwardly displace until the housing member 102 is in the second actuation position, illustrated in FIG. 6B. In this second actuation position, the screen contact surface 135 at the second end 128 of the intermediate portion 110 makes contact with the screen surface 36 of the touchscreen gaming device 12. That is, in the second actuation position, at least a portion of the screen contact surface 135 of the intermediate portion 110 intersects the reference plane that is coplanar with the bottom contact surface 156 of the support member 104.

When the screen contact surface 135 makes contact with the screen surface 36, an electrical charge generated by the user's finger is conducted through the housing member 102 and transmitted to the portion of the screen surface 36 that is in contact with (or is immediately adjacent to) the screen contact surface 135. Accordingly, by displacing the actuator member from the first actuator position to the second actuator position as described, the user can establish contact with the screen surface 36 of a touchscreen gaming device 12 at a desired time and location to repetitively, rapidly, and accurately issue a command to the touchscreen gaming device 12, such as a command to fire a weapon during the play of a game on the touchscreen gaming device 12.

Referring additionally to FIGS. 7A-C, another exemplary embodiment of an actuation assembly 700 is illustrated, where the button portion 738 (which is a conductive component such as formed from a conductive material as described in the other exemplary embodiments) has not been biased and the assembly is in a first actuation position. As can be seen from this illustration, a bottom contact surface 748 is remote from or otherwise separated from a screen display of a touchscreen device (not shown). The bottom contact surface 748 is substantially aligned with a bottom aperture 726 (shown more clearly in FIG. 7C). The button portion 738 can be biased by a resilient member 754, which in this embodiment is a flexible, deformable thin film or diaphragm. The thin film 754 can have various shapes and can be made from various materials (e.g., rubber) which are selected to provide the desired bias against an actuation force.

As shown in FIG. 7B, an actuation force applied downwardly to the button portion 738 moves the button portion downward against the bias of the thin film 754 and positions the bottom contact surface 748 at least partially through the bottom aperture 726 in a second actuation position. This second actuation position enables an electrically conductive path to be established between the button portion 738 (in particular the top surface of the button portion) and the screen display of a touchscreen device (not shown). Various techniques and components can be utilized for releasably securing the assembly 700 with the screen display, such as the suction tape illustrated in FIG. 7A. In one embodiment, the button portion 738 and the thin film 754 can be contained or partially contained within an annular casing 720. Exemplary dimensions are illustrated for the assembly 700, however, it should be understood that various dimensions can be utilized, such as based on the size of the touchscreen device.

While the actuation assembly 10, 100, 700 has been described as being used in conjunction with a touchscreen gaming device 12, one having ordinary skill in the art would understand that the actuation assembly 10, 100 may be used with any capacitive touchscreen device. For example, such a capacitive touchscreen device may be a tablet, smartphone, or other personal computer that is not used as a gaming platform.

It should be understood that the exemplary embodiments described herein can be used with various touchscreen devices in which actuation of the exemplary housing provides an actuation signal to the screen display of the touchscreen device, such as through changing capacitance, switching between electrically conductive paths and electrically isolated paths, and so forth.

While various embodiments have been described above, this disclosure is not intended to be limited thereto. Variations can be made to the disclosed embodiments that are still within the scope of the appended claims.

What is claimed is:

1. An actuation assembly for use with a touchscreen device, the actuation assembly comprising:
    a housing having a wall portion and a bottom portion that define a housing interior, wherein the bottom portion defines a bottom aperture and a housing contact surface, wherein the housing contact surface includes a connecting member that provides a releasable connection between the housing contact surface and a screen surface of the touchscreen device;
    an actuator member positioned at least partially in the housing interior, wherein the actuator member includes a top portion and a stem portion, wherein the stem portion includes a terminal end substantially aligned with the bottom aperture of the bottom portion of the housing, wherein the actuator member includes electrically conductive material providing an electrically conductive path between the top portion and the terminal end;
    an end cap connected to the housing, wherein the end cap defines a cap aperture, wherein the top portion of the actuator member is positioned at least partially through the cap aperture; and
    a resilient member positioned in the housing interior between the top portion of the actuator member and the bottom portion of the housing,
    wherein the resilient member biases the actuator member in a first actuation position in which the terminal end of the stem portion of the actuator member is remote from the housing contact surface of the bottom portion of the housing such that the top portion of the actuator member is electrically isolated from a target area of the screen surface of the touchscreen device to prevent a transfer of electrical charge between the top portion of the actuator member and the screen surface of the touchscreen device,
    wherein the actuator member is displaceable relative to the housing such that a force applied to the top portion of the actuator member against a bias of the resilient member displaces the actuator member to a second actuation position in which the terminal end of the stem portion is received into the bottom aperture of the housing and the terminal end of the stem portion is coplanar with or substantially coplanar with the housing contact surface of the bottom portion of the housing,
    wherein in the second actuation position, the terminal end of the stem portion of the actuator member contacts the target area of the screen surface of the touchscreen device to provide an electrically conductive path between the screen surface and the top portion of the actuator member to allow transfer of electrical charge between the top portion of the actuator member and the screen surface of the touchscreen device.

2. The actuation assembly of claim 1, wherein the connecting member comprises an adhesive material that releasably connects the housing contact surface with the screen surface of the touchscreen device.

3. The actuation assembly of claim 1, wherein the connecting member comprises a layer of tape, and wherein the layer of tape comprises a plurality of suction cups.

4. The actuation assembly of claim 3, wherein the layer of tape covers an entire housing contact surface.

5. The actuation assembly of claim 1, wherein the resilient member is a coil spring.

6. The actuation assembly of claim 5, wherein the coil spring surrounds the stem portion of the actuator member.

7. The actuation assembly of claim 1, wherein the actuator member includes a flange portion disposed between the top portion and the stem portion.

8. The actuation assembly of claim 1, wherein the actuator member comprises polyurethane and carbon dust.

9. An actuation assembly for use with a touchscreen device, the actuation assembly comprising:
- a housing defining a bottom aperture and a cap aperture, wherein the housing defines a housing interior, wherein the housing includes a connecting member for releasably connecting the housing to a screen surface of the touchscreen device;
- a resilient member; and
- an actuator member positioned at least partially in the housing interior, wherein the actuator member has a top portion and a terminal end that is opposite to the top portion, wherein the resilient member biases the actuator member to a first actuation position in which the top portion extends at least partially through the cap aperture, wherein the actuator member comprises material that allows an electrical charge to be conducted between the top portion and the terminal end,
- wherein the actuator member is displaceable relative to the housing such that upon application of a force to the actuator member against a bias of the resilient member, the terminal end moves at least partially through the bottom aperture of the housing to allow the terminal end to contact a target area of the screen surface of the touchscreen device such that the electrical charge is allowed to be conducted between the top portion of the actuator member and the target area of the screen surface, and
- wherein the actuator member includes a flange portion connected with the top portion, wherein the resilient member abuts against the flange portion, and wherein the flange portion has a diameter greater than a diameter of the cap aperture.

10. The actuation assembly of claim 9, wherein the connecting member comprises an adhesive material that releasably connects the housing with the screen surface of the touchscreen device.

11. The actuation assembly of claim 9, wherein the connecting member comprises a plurality of suction cups.

12. The actuation assembly of claim 9, wherein the resilient member is a coil spring.

13. The actuation assembly of claim 12, wherein the coil spring surrounds a stem portion of the actuator member, and wherein the stem portion is between the top portion and the terminal end of the actuator member.

14. The actuation assembly of claim 9, wherein the actuator member is made from polyurethane and carbon dust.

15. The actuation assembly of claim 9, wherein the actuator member and the housing are substantially concentrically aligned.

16. An actuation assembly for a touchscreen device, the actuation assembly comprising:
- a deformable housing member having a base portion, a button portion, and an intermediate portion between the base portion and the button portion, wherein the intermediate portion inwardly extends from the base portion and outwardly extends from the button portion; and
- a support member connected to the base portion of the housing member, wherein a bottom contact surface of the support member releasably connects to a screen surface of the touchscreen device, wherein the support member comprises an electrically-insulating material,
- wherein a force applied to a top surface of the button portion causes the housing member to deform from a first actuation position into a second actuation position,
- wherein in the first actuation position, the intermediate portion is longitudinally offset from a reference plane that is coplanar with the bottom contact surface of the support member such that the intermediate portion is separated from the screen surface of the touchscreen device,
- wherein in the second actuation position, a portion of the intermediate portion intersects the reference plane such that the portion of the intermediate portion is in contact with a target area of the screen surface of the touchscreen device,
- wherein the button portion and the intermediate portion comprise an electrically-conductive material such that in the first actuation position, an electrical charge is prevented from being conducted between the button portion to the target area, and such that in the second actuation position, the electrical charge is conducted between the top surface of the button portion and the target area of the screen surface of the touchscreen device.

17. The actuation assembly of claim 16, wherein the support member comprises an adhesive material that releasably connects the base portion with the screen surface of the touchscreen device.

18. The actuation assembly of claim 16, wherein the support member comprises a plurality of suction cups.

19. The actuation assembly of claim 16, wherein the intermediate portion comprises a resilient member providing an opposing force to the force applied to a top surface of the button portion, wherein the base portion, the intermediate portion and the button portion are substantially concentrically aligned and wherein the button portion, the intermediate portion and the base portion are formed as a single unitary part.

20. The actuation assembly of claim 1, wherein the top portion of the actuator member, the actuator member and the resilient member are formed as a single unitary part.

* * * * *